Patented Dec. 15, 1942

2,304,950

UNITED STATES PATENT OFFICE 2,304,950

GERMICIDE

Morgan Parker, Katonah, N. Y., and Thomas H. Frost, Danbury, Conn., assignors to Bard-Parker Company, Inc., Danbury, Conn., a corporation of New York No Drawing. Application July 26, 1939, Serial No. 286,582

15 Claims. (Cl. 167—26)

The invention pertains to a composition of matter having germicidal properties. More particularly, it relates to a germicidal composition for the sterilization of surgical instruments, and includes correlated improvements and discoveries whereby the properties of such a composition are enhanced.

An object of the invention is the provision of a composition of matter having high germicidal value and which is of distinctive effectiveness at room temperatures.

Another object of the invention is to provide a germicidal composition possessing marked activity without corrosive action upon metal objects with which it may come in contact.

A further object of the invention is the provision of a liquid germicidal composition containing an aldehyde, a volatility accelerator and a corrosion inhibitor for the non-corrosive sterilization of metallic objects, and having a germicidal value which is several times that of formaldehyde compositions previously utilized.

An additional object of the invention is to provide a germicidal composition which is effective in vapor or in liquid phase, either or both, which may be readily and economically manufactured commercially, and which may be stored for prolonged periods without loss of activity.

A specific object of the invention is to provide a germicidal composition in liquid form containing a compound of germicidal activity, a compound which increases the volatility, i. e., a volatility accelerator, a compound that inhibits corrosion of metals, and an alkalizing agent.

Other objects of the invention will in part be obvious and will in part appear hereinafter.

The invention accordingly comprises a composition of matter possessing the characteristics, properties and the relation of constituents which will be exemplified in the composition hereinafter described and the scope of the invention will be indicated in the claims.

In the practice of the invention a composition having germicidal activity may be produced by combining, preferably in liquid form, which may be as a solution of the various components, a germicidal agent usually in the form of a solution containing a greater or lesser amount of water, a compound having the property of increasing the volatility of the finished composition and which more especially may be an organic liquid of relatively low boiling point, and a compound, organic or inorganic, which prevents or inhibits in large measure the corrosion of metals with which it may come in contact.

There may be included also a substance which renders the composition slightly alkaline or neutral, as may be desired. The composition suitably is in liquid condition, and is so utilized for the sterilization of objects or materials, more particularly for the sterilization of surgical instruments. For such purpose the germicide is markedly efficacious in that it not only kills bacteria, including spore bacteria, but it is without corrosive or dulling action upon the instruments which may be placed therein. Moreover, the balancing of the various components is such that when a sterilized object is removed therefrom the composition evaporates readily and without leaving any substantial deposit upon the surfaces. Inasmuch as the composition is non-corrosive and non-dulling, surgical instruments may be placed therein and permitted to remain for extended periods of time without any noticeable disadvantageous effect. Furthermore, the germicidal composition possesses distinctive germicidal value at room temperatures, and does not require heating to accomplish a sterilization. This property is of marked significance since necessity for a heating medium is obviated as are certain disadvantages which attend the raising of keen edged and carefully balanced surgical instruments to relatively high temperatures.

The compound preferably availed of for germicidal action is formaldehyde, and especially in the usual form, namely, as U. S. P. formaldehyde. It has been found that an amount of formaldehyde which, for practical purposes, brings about a ready sterilization, is preferably 7 to 8% (meaning the absolute formaldehyde content, equivalent to approximately 17½ to 20% U. S. P. formaldehyde), it having been found that when less than 7% is used the efficiency is reduced, and in the event that more than 8% is included the increase in germicidal value is not such as to justify the larger amount in view of drawbacks, such as some undesirable action upon the user's hands, more marked and disagreeable odor of formaldehyde, and added cost. Tests indicate that such a composition having 7 to 8% formaldehyde is at least five times as effective as previous compositions having about 3.2% formaldehyde.

As a means for increasing the volatility of the liquid composition there may be used a saturated aliphatic alcohol having not more than three carbon atoms, namely, methyl, ethyl, propyl and isopropyl alcohols. These alcohols may be employed alone or in compatible admixture, but preferably the composition contains an amount of methyl alcohol. The alcohol desirably is the preponderant component and may be present in an initial amount of 70% of the finished product with addition of a further amount which is sufficient to bring the composition to 100 parts. As a corrosion inhibitor, use may be made of an inorganic salt containing a reducing anion, or of an aliphatic derivative of nitrous acid. The inorganic salt may be of ammonium; of an alkali metal, e. g., sodium, potassium, lithium, cesium and rubidium; of an alkali earth metal, as calcium, barium and strontium, or of magnesium, and as reducing anions mention may be made of a nitrite, thiosulfate, hypophosphite, hydrosulfite and sulfite. Such a compound may be present in the composition in a small amount, usually not greater than 0.2%, and satisfactory results have been obtained when using smaller amounts, such as 0.01% nitrite content.

A composition which is neutral, or slightly alkaline, is preferred when metallic objects are to be sterilized, since thereby corrosive action is further decreased. This condition may be brought about by the inclusion of a small amount of an alkalizing agent, which may be sodium or potassium hydroxide, or a compound which gives rise to these hydroxides as a result of the hydrolysis. Further, the alkalizing of the solution may result from the hydrolysis of the compound which is introduced to inhibit corrosion of metals.

Sterilization of objects may be brought about by the germicidal composition, either in liquid or in vapor phase. Suitably, the water content is maintained at a low percentage, although the presence of the corrosion inhibitor permits it to rise as high as 35% without occasioning corrosion or rusting to an undue extent. It is preferable to use less water and more of the alcohol, which may be methyl alcohol or a higher alcohol containing some methyl alcohol, in order to increase the rapidity with which the composition evaporates from the object treated, but the presence of some water is desirable since it is believed that the activity of formaldehyde is thereby increased. Moreover, the volatility of the composition, particularly when containing such alcohols in substantial proportion, may be such as to facilitate the formation of vapors from the liquid so that when it is placed in a covered receptacle the enclosed vapors are sufficient to sterilize objects in the receptacle even though not fully immersed in the composition. When the germicidal composition is to be employed for sterilizing in the vapor phase, the corrosion inhibitor should be a compound which is of comparatively ready volatility, and such suitably may be an aliphatic nitrite, e. g., the methyl, ethyl, propyl, butyl and amyl nitrites. These organic nitrites volatilize readily and hence pass into the vapor phase along with the germicide, as formaldehyde, and thus inhibit corrosion of the metallic objects undergoing sterilization.

As an illustrative embodiment of a manner in which the invention may be practiced, the following examples are presented. The percentages are by weight.

Example I

|  | Per cent |
|---|---|
| U. S. P. formaldehyde (40% formaldehyde) | 20 |
| Ethyl alcohol (96%) | 69.5 |
| Sodium nitrite | 0.1 |
| Sodium hydroxide | 0.025 |
| Ethyl alcohol, specially denatured, (formula #30—100 parts ethyl alcohol 10 parts methyl alcohol) | 10 |

The U. S. P. formaldehyde in its usual aqueous solution, is combined with ethyl alcohol, sodium nitrite and sodium hydroxide to form an initial solution, and then specially denatured ethyl alcohol is added to make 100 parts of finished composition.

Example II

A formaldehyde composition may be prepared as in Example I with the inclusion of 0.1% of calcium nitrite instead of sodium nitrite, and of 0.03% potassium hydroxide in place of sodium hydroxide.

Example III

A formaldehyde composition as in Example I may be prepared which contains potassium hypophosphite in an amount of 0.2% instead of sodium nitrite.

Example IV

A germicide adapted for use in the vapor phase may be produced having the following composition:

|  | Per cent |
|---|---|
| U. S. P. formaldehyde | 20 |
| Ethyl alcohol (96%) | 69.5 |
| Ethyl nitrite | 0.15 |
| Sodium hydroxide | 0.025 |
| Ethyl alcohol, specially denatured, (formula #30—100 parts ethyl alcohol 10 parts methyl alcohol) | 10 |

The compositions illustrated by the foregoing examples are characterized by high germicidal activity. That containing formaldehyde, especially possesses the property of being several times more effective in killing bacteria than formaldehyde compositions previously produced for the non-corrosive sterilization of metallic or inanimate objects. Moreover, the compositions contain an amount of the germicide to give an effective sterilization; of water to accelerate the germicidal effect; of an alcohol to bring about rapid evaporation, with accompanying fumigation in vapor phase in closed containers; of a corrosion inhibitor containing a reducing anion to protect metallic objects which it touches; of an alkalizing agent to bring the composition to neutral, or slightly alkaline condition, and of the various solid constituents so that there will not be an undue deposition upon metallic objects, especially surgical instruments.

More particularly, the composition is a strong solution of formaldehyde in combination with a relatively large amount of ethyl alcohol, a small quantity of methyl alcohol and a very small quantity of a compound containing a reducing anion which protects metal objects against corrosion. There may also be included a small quantity of an alkalizing agent which suffices to render the composition neutral or slightly alkaline so that attack upon metal objects will be lessened and heavy metal impurities in the composition removed in the form of a precipitate.

Furthermore, the germicidal composition efficiently kills bacteria, including spore bacteria, not only when objects to which they are attached are immersed in the composition, but also when such objects are in contact with the vapors in a closed container. Consequently, surgical instruments will be fully sterilized even though they are not completely immersed, since those parts projecting from the liquid will undergo sterilization through contact with the vapors. Furthermore, and this is to be especially noted, these vapors also sterilize the interior portion of the container above the level of the solution therein, so that sterile instruments, when removed from the solution, may not be re-contaminated by accidental contact with the interior walls or rim of the sterilizer. Moreover, the composition is without harm to instruments sterilized thereby; is sufficiently volatile to evaporate rapidly when objects are removed therefrom; does not deposit substantial quantities of solid materials upon objects, and such quantities as do deposit are without toxic effect. Heating or other particular treatment is not required either in production or in use, and undesirable odors, as that of formaldehyde, are not present to an undesirable extent.

Since certain changes may be made in the above composition of matter and different embodiments of the invention could be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A composition of matter comprising formaldehyde in an amount of about 7 to 8%, an aliphatic alcohol containing not more than three carbon atoms in preponderant amount, and an aliphatic nitrite.

2. A composition of matter comprising formaldehyde in amount of about 7 to 8%, ethyl alcohol in preponderant amount, methyl alcohol, and ethyl nitrite in an amount of about 0.15%.

3. A composition of matter comprising formaldehyde in an amount of about 7 to 8%, ethyl alcohol in preponderant amount, methyl alcohol, a corrosion inhibitor containing a reducing anion belonging to the group consisting of nitrite, thiosulfate, hypophosphite, hydrosulfite and sulfite, and an alkalizing agent.

4. A composition of matter comprising formaldehyde in an amount of about 7 to 8%, ethyl alcohol in preponderant amount, methyl alcohol, a nitrite, water, and an alkalizing agent.

5. A composition of matter comprising formaldehyde in an amount of about 7 to 8%, an aliphatic alcohol containing not more than three carbon atoms in preponderant amount, and ethyl nitrite, said composition being volatile and adapted to effect sterilization of metallic objects at room temperature with no corrosive action thereon, and volatilizing without residue.

6. A composition of matter comprising formaldehyde in an amount of about 7 to 8%, an aliphatic alcohol containing not more than three carbon atoms in preponderant amount, and a compound containing a reducing anion belonging to the group consisting of nitrite, thiosulfate, hypophosphite, hydrosulfite and sulfite.

7. A composition of matter comprising formaldehyde in an amount of about 7 to 8%, methyl alcohol, a higher aliphatic alcohol containing not more than three carbon atoms in preponderant amount, and a compound containing a reducing anion belonging to the group consisting of nitrite, thiosulfate, hypophosphite, hydrosulfite and sulfite.

8. A composition of matter comprising formaldehyde in an amount of about 7 to 8%, ethyl alcohol in preponderant amount, and a compound containing a reducing anion belonging to the group consisting of nitrite, thiosulfate, hypophosphite, hydrosulfite and sulfite.

9. A composition of mater comprising formaldehyde in an amount of about 7 to 8%, methyl alcohol, ethyl alcohol in preponderant amount and an inorganic salt containing a reducing anion belonging to the group consisting of nitrite, thiosulfate, hypophosphite, hydrosulfite and sulfite, and a basic constituent belonging to the group consisting of ammonium, an alkali metal, an alkali earth metal and magnesium.

10. A composition of matter comprising formaldehyde in an amount of about 7 to 8%, ethyl alchol in preponderant amount, and a nitrite.

11. A composition of matter comprising formaldehyde in an amount of about 7 to 8%, ethyl alcohol in preponderant amount, methy alcohol, water and a nitrite.

12. A composition of matter comprising formaldehyde in an amount of about 7 to 8%, an aliphatic alcohol containing not more than three carbon atoms in preponderant amount, and a nitrite.

13. A composition of matter comprising formaldehyde in an amount of about 7 to 8%, an aliphatic alcohol containing not more than three carbon atoms in preponderant amount, a nitrite and an alkalizing agent.

14. A composition of matter comprising formaldehyde in an amount of about 7 to 8%, methyl alcohol, a higher aliphatic alcohol containing not more than three carbon atoms in preponderant amount, a nitrite, and an alkalizing agent.

15. As a composition of matter a solution containing formaldehyde in an amount of about 7 to 8%, an alcohol belonging to the group consisting of methyl, ethyl and propyl alcohols in preponderant amount, and a nitrite, all in volatile form.

MORGAN PARKER.
THOS. H. FROST.